Dec. 30, 1969    R. E. KINZLY    3,487,227
THREE-APERTURE OPTICAL INTERFEROMETER
Filed Dec. 22, 1966    2 Sheets-Sheet 1
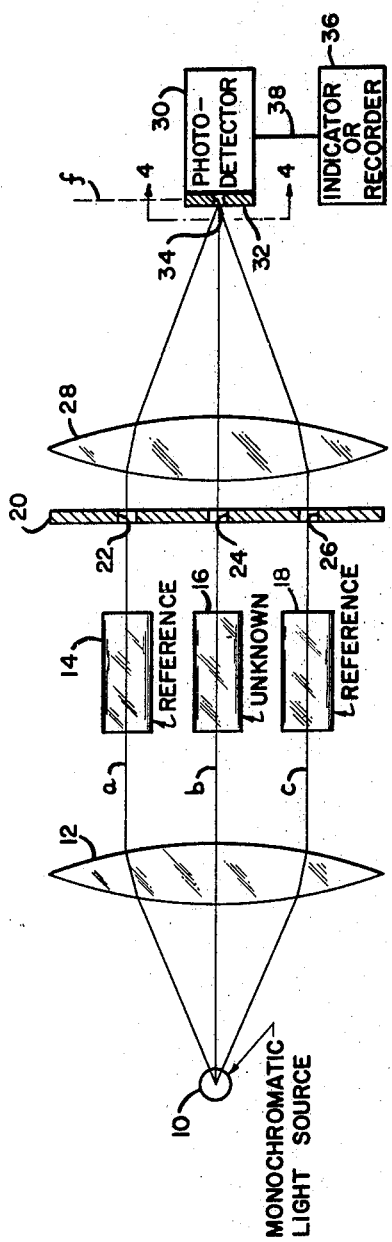
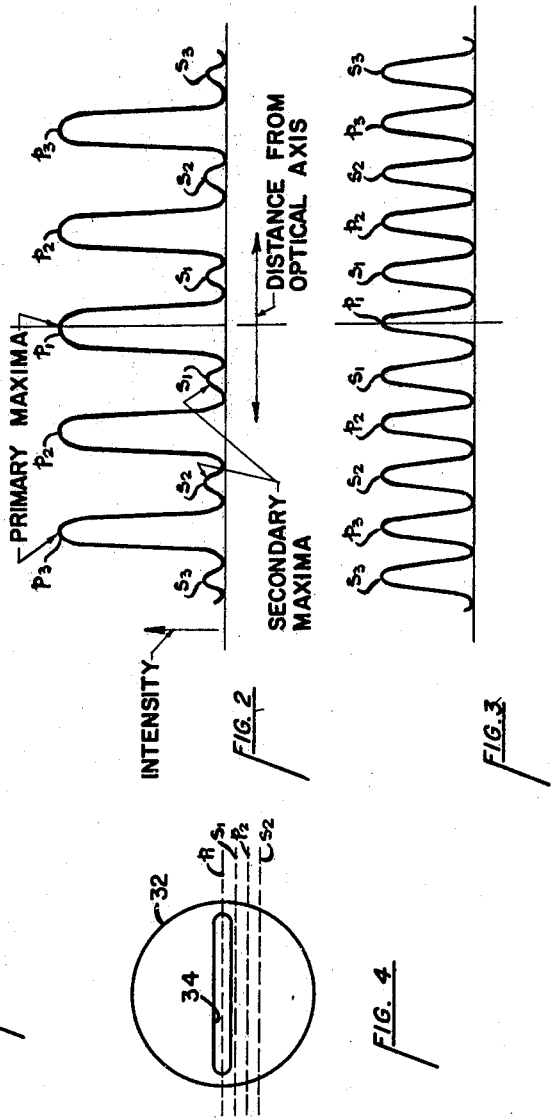
INVENTOR
ROBERT E. KINZLY.
BY
AGENT.

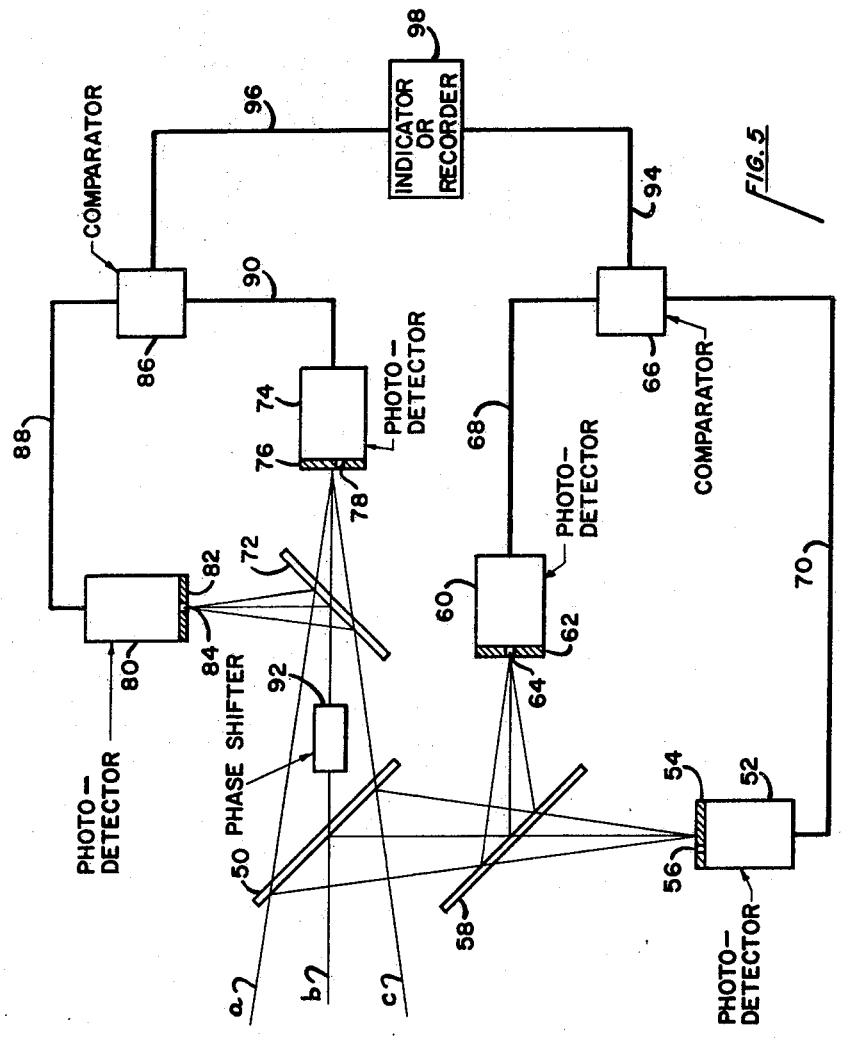

United States Patent Office 3,487,227
Patented Dec. 30, 1969

3,487,227
THREE-APERTURE OPTICAL INTERFEROMETER
Robert E. Kinzly, Buffalo, N.Y., assignor to Cornell Aeronautical Laboratory, Inc., Buffalo, N.Y., a corporation of New York
Filed Dec. 22, 1966, Ser. No. 603,836
Int. Cl. H01j 39/12, 3/14; G01n 21/26
U.S. Cl. 250—237                                   5 Claims

ABSTRACT OF THE DISCLOSURE

An interferometer having three colinear apertures placed in front of a lens producing an interference fringe pattern in the focal plane of the lens from monochromatic light passing through the three apertures. The optical path difference between a wavefront passing through the center aperture and two in phase wavefronts passing through the outer two apertures is proportional to the intensity changes of the interference fringes as sensed by a photodetector.

Background of the invention

The present invention relates to optical instruments and, more particularly, to an optical interferometer that senses and measures optical path differences.

Conventional interferometers as the Michaelson or Young instruments measure distance by counting the number of interference fringes that move past a given reference point in the fringe field. With these types of interferometers the sensitivity of the detector to the motion of the fringes must be high in order to detect small optical path changes which are manifested as fringe displacements. Thus, very slight vibrations in the plane of detection may be erroneously detected as a fringe shift.

With the interferometer according to the present invention, optical path length differences or phase changes are manifested as changes in the intensity of the fringes of the interference pattern rather than movement of the fringes across the interference plane. This feature of the present invention has the important advantage of decreasing the sensitivity of the interferometer to vibrations of system components, thereby significantly reducing a source of "noise" in the measurement of small optical path variations.

Basically, the present invention in one of its aspects is characterized by a mask having three small apertures located in front of a lens which converges the light passing through the apertures into a common image plane where a Fraunhofer interference pattern is produced. When the wavefronts passing through the apertures originate from a coherent source and the wavefront through the central aperture experiences a change in phase or path length, it has been found that the fringes of the interference pattern change in intensity a proportionate amount without undergoing any lateral movement. A suitable detection system is provided which is sensitive to such intensity changes to provide an indication as to the magnitude of phase shift or optical path difference. Thus, the present invention provides a means for producing an interference fringe pattern wherein changes in fringe intensity are proportional to changes in optical path length between two reference wavefronts and a variable unknown wavefront and a detection system for use therewith.

Brief description of the drawings

FIGURE 1 is a schematic representation of one form of the present invention as applied to gas purity analysis.
FIGURE 2 is a graphical representation of a typical interference pattern without any change in optical path length and neglecting the diffraction envelope.
FIGURE 3 is a graphical representation of the interference pattern of figure 2 with a change in optical path length equal to a quarter of a wave length.
FIGURE 4 is an elevational view of the detection mask used in association with the detector of FIGURE 1 taken along lines 4—4 thereof.
FIGURE 5 is a modification of the embodiment of FIGURE 1 wherein an improved detection system is employed.

Description of the preferred embodiment

In the following description, the improved interferometer will be applied to gas purity analysis for illustrative purposes only; it being understood that the interferometer can be used in any situation where optical path differences are to be determined.

Referring now to the drawings and, more particularly, FIGURE 1, a source of monochromatic or quasi monochromatic light is shown schematically at 10. The light from source 10 is collimated by passing it through a suitable lens 12. Any suitable means that develop parallel rays $a$, $b$, and $c$ could be utilized. As shown, ray $b$ is coincident with the optical axis of the apparatus.

Three identical transparent chambers 14, 16, and 18 are arranged to intercept, respectively, rays $a$, $b$, and $c$. The outer chambers 14 and 18 are adapted to contain identical samples of a reference gas, which might be representative of a desired or acceptable purity. Chamber 16 is adapted to contain a test sample of gas, whose purity might be unknown. As to apparent, beam $a$ after passage through chamber 14 and beam $c$ after passage through chamber 18 experience identical changes in optical path lengths, since the chambers and the gases therein are identical and have identical refractive indices.

A circular mask 20 is located adjacent chambers 14, 16, and 18 and contains three small apertures, 22, 24, and 26 that are respectively coaxial with beams $a$, $b$, and $c$ passing through their respective chambers. Except for the apertures, the mask 20 is opaque and may be fabricated of a thin metallic sheeting or the like. The shape of the apertures 22, 24, and 26 is immaterial; they may be circular, rectangular or square. A spherically convex lens 28 is located immediately adjacent mask 20 and functions to converge the light passing through the apertures 22, 24, and 26 into a common image plane $f$ equivalent to the focal plane of the lens where a Fraunhofer interference pattern is produced, as will be discussed infra. As shown, the diameter of lens 28 is substantially equal to the diameter of mask 20. It is to be understood that lens 28 is shown as exemplary only, and that any suitable means might be utilized for causing the light from rays $a$, $b$, and $c$ to converge. For example, the lens 28 could be replaced by mirrors or prisms suitably oriented.

A conventional photodetector 30 which may be a photomultiplier tube is located at image plane $f$ and is adapted to respond to the intensity of the light reaching it. Located in front of photodetector 30 is a detection mask 32 in the form of circular disc that is opaque except for a central slit 34, as shown in FIGURE 4. Suitable indicating or recording means 36 is in electrical communication with the output of detector 30 via line 38 for delivering an output that is proportional to the intensity of the light sensed by the detector.

Assuming that the unknown gas in chamber 16 is identrical to the gas in the other two chambers, then there would be no optical path difference between the beams $a$, $b$, and $c$ as they emerge from the apertures in mask 20. The lens 28 causes these beams to converge and interfere forming a Fraunhofer fringe pattern in plane $f$ on detection mask 32. The plot of the intensity of this pattern is shown in FIGURE 2, as a function of distance away from the optical axis that is coincident with ray $b$. For simplicity and ease in presentation, the effects of the diffraction caused by the geometrical shape of the apertures 22, 24, and 26 is not illustrated. This is justified at the center of the fringe pattern where the diffraction effect or envelope is negligible. Thus as shown in FIGURE 2, with light passing through three apertures and of equal phase, there is observable high intensity fringes $p_1$, $p_2$, and $p_3$, called primary maxima, and lower intensity fringes $s_1$, $s_2$, and $s_3$, called secondary maxima. For a mathematical discussion and derivation of these fringes, reference may be had to any standard text on physical optics as, for example, "Fundamentals of Optics" by Jenkins and White, Third Edition, McGraw Hill, p. 328 et seq.

It has been found according to the present invention that as the optical path of the central beam $b$ passing through aperture 24 changes relative to the outer two beams $a$ and $c$, the intensity of the primary and secondary fringes undergo a proportionate change in opposite sense. Thus as shown in FIGURE 3 where ray $b$ experiences a change in phase or path length equal to one quarter wavelength of the light from source 10, the primary maxima $p_1$, $p_2$, and $p_3$ decrease in intensity whereas the secondary maxima $s_1$, $s_2$, and $s_3$ increase in intensity. Such increase or decrease in intensity is directly proportional to the change in optical path length of central ray $b$. As is obvious from FIGURE 3 a change of one quarter wavelength causes the primary and secondary maxima to assume equal intensities. A complete reversal of intensity will occur when the change in phase or path length equals one-half wavelength of the light from sourc 10. It is important to note that this change in intensity occurs without any displacement or lateral movement of the fringes.

Referring again to FIGURES 1 and 4, each individual fringe is imaged on detection mask 32 in the plane of slit 34 on a parallel axis therewith. Thus the axis of fringe $p_1$ would be coaxial with slit 34 and the axis of the other fringes would be parallel thereto as shown by the broken lines in FIGURE 4. The central slit 34 will allow only the light from fringe $p_1$ to fall upon photodetector 30, but since each individual fringe undergoes a change in intensity that is proportional to the optical path change, observation of only one will suffice. It is apparent, however, that more slits in mask 32 could be provided to allow the intensity changes of a plurality of primary maxima fringes to be observed by photodetector 30. Alternatively, one or more slits may be provided to allow the photodetector to observe one or more secondary maxima fringe variations, or a plurality of photodetectors may be provided to observe both primary and secondary maxima variations.

As the optical path of ray $b$ changes from zero to one-half wavelength, the output of photodetector will decrease from a maximum value to a minimum value and as the path goes from one-half to one wavelength, the detector output will go from the minimum value back to the maximum value. The detector output will thus oscillate between limiting values, the number of oscillations being indicative of the multiple number of half wavelength changes whereas, the final value is indicative of that fraction of a half wavelength that the optical path has changed. For example, a change of 3¼ wavelengths will produce 6½ oscillations.

It has been found that system described supra is extremely sensitive to changes near ¼ wavelength but the sensitivity falls off appreciably for changes near zero wavelengths. This is due to the fact that the output of the detector varies as a function of the cosine of the phase shift and the cosine curve changes most rapidly in the region of $\pi/2$ radians or ¼ wavelength.

The modification shown in FIGURE 5 is adapted to overcome these sensitivity limitations by providing a detection system that is equally sensitive both to very small path differences or phase shifts for all ranges. As shown in FIGURE 5, the rays $a$, $b$, and $c$ are depicted as they leave the lens 28 of FIGURE 1. A first beam splitter 50 is inclined at an angle of 45° to the axis of central ray $b$ for causing the rays to be reflected downwardly. A first photodetector 52 is arranged at the image plane of these downwardly reflected rays. A detection mask 54 having one or more slits 56 is located immediately in front of the detector 52 as was previously described. Arranged to intercept the downwardly reflected rays is a second beam splitter 58 which causes a portion thereof to be reflected laterally. A second photodetector 60 is arranged at the image plane of the laterally reflected rays and has a detection mask 62 with one or more slits 64. A comparator 66 is provided to develop a signal that is indicative of the difference between the outputs of photodetectors 60 and 52 as transmitted via lines 68 and 70, respectively. The comparator might typically comprise a voltage differencing circuit or the like.

A third beam splitter 72 is arranged to intercept the rays that pass straight through first splitter 50 causing a portion thereof to pass straight through towards a third photodetector 74 and a portion to be reflected upwardly towards a fourth photodetector 80; the photodetectors 74, 80 having detection mask 76, 82 containing slits 78, 84, respectively. A comparator 86 is provided to develop a signal that is indicative of the difference between the outputs of photodetectors 80 and 74 as transmitted via lines 88 and 90, respectively. Located intermediate beam splitter 50 and 72 and arranged to intercept only central ray $b$ is a phase shifter 92 which might be a quarter wave plate. a defocussed lens or the like. Phase shifter 92 functions, for reasons to become apparent hereinbelow, to cause the central ray $b$ to undergo an optical path change equal to ¼ of a wavelength. Thus assuming that ray $b$ initially was equal in phase to rays $a$ and $c$, the phase shifter 92 will cause the interference pattern of the three rays to resemble that shown in FIGURE 3 wherein each fringe, primary maxima and secondary maxima, has equal intensity.

It will be noted that each of slits 56 and 78 is spaced from the optical axis of its respective photodetector 52 or 74 thereby enabling these photodetectors to respond to the intensity of the secondary maxima $s_1$ as shown in FIGURES 2 and 3. It is obvious that additional slits suitably spaced would allow the detectors to respond to more than one secondary maxima fringe. The slits 64 and 84 are centrally located such that detectors 60 and 80 respond to the intensity changes of the primary maxima fringes.

In the operation of the FIGURE 5 embodiment assuming that the unknown ray $b$ experiences an optical change equal to $\theta$ expressed in radians of phase shift, then the output in lines 68 and 70 would be proportional to such phase shift as was the case with the FIGURE 1 embodiment. In fact, as pointed out earlier, the signals would be proportional to the cosine of the phase shift, $\theta$. The two signals are subtracted by comparator 66 and developed a signal in line 94 that is also proportional to $\cos \theta$. Since the $\cos \theta$ is substantially linear when $\theta$ equals $\pi/2$ or ¼ wavelength, it is apparent that the signal in line 90 is most sensitive to changes in phase that border on ¼ wavelength or odd multiples thereof.

With a change in phase equal to $\theta$ ray $b$ experiences an additional phase change equal to $\pi/2$ (¼ wavelength) as it passes through shifter 92. As already described with regard to detectors 52 and 60, signals will be developed in lines 88 and 90 that will be functions of the cosine of the total phase shift of ray $b$ which is cosine $$\theta + \frac{\pi}{2}$$

Cosine $$\theta + \frac{\pi}{2}$$

reduces to sin $\theta$. Thus, the output from each of the detectors 80 and 74 and comparator 86, will be proportional to sin $\theta$ which is nearly linear about $\theta$ equal to or ½ wavelength or multiples thereof. It will thus be apparent that the signals indicated or recorded by suitable means 98 from comparators 66 and 86 via lines 94 and 96 will be sensitive to optical path changes centered about ¼ and ½ wavelengths and all multiples thereof.

As mentioned earlier the interforameter according to the present invention can be used to measure any phenomenon that is manifested as a change in optical path. Changes in optical path are obtained by changing the length of the geometrical path or by changing the index of refraction along the geometrical path. For example, the calibration of a piezoelectric transducer depends upon a change in geometrical path length, whereas gas density measurements depend upon changes in the average index of refraction along the path. Thus with the application to gas purity analysis, mentioned as exemplary, the index of refraction difference between the unknown gas in chamber 16 and the reference gas in chambers 14 and 18 would be the unknown property that the interferometer would measure.

With the interferometer according to the present invention phase differences on the order of $10^{-3}$ wavelengths have been accurately measured which for red light would equate to a distance of about $3 \times 10^{-8}$ inches.

While a preferred manner of practicing the concept of the present invention has been described, other modifications will occur to those skilled in the art; therefore, it is intended that the invention is to be limited only by the scope of the appended claims.

What is claimed is:

1. An optical interferometer for measuring changes in optical path of an unknown wavefront with respect to two reference wavefronts as a function of interference fringe intensity, comprising;
    (a) means forming three parallel substantially monochromatic wavefronts,
    (b) means causing said wavefronts to converge forming an interference pattern having primary and secondary maxima fringes,
    (c) means for splitting said converging wavefronts into at least two paths,
    (d) means in one of said paths for shifting the phase of one of said wavefronts, and
    (e) means in each of said paths for sensing the intensity of at least one of said primary or secondary maxima fringes.
2. The interferometer according to claim 1 further comprising;
    (f) means for varying the optical path of said one wavefront before said wavefronts are split into said two paths.
3. The interferometer according to claim 2 wherein;
    (g) said means causing said wavefronts to converge includes a mask containing three apertures each one of which is in line with a separate one of said wavefronts, and
    (h) said one wavefront passes through the central aperture.
4. The interferometer according to claim 3 wherein;
    (i) said means for causing said wavefronts to converge further includes a convex lens located immediately adjacent said mask.
5. The interferometer according to claim 4 wherein;
    (j) said intensity sensing means in each path comprises photo-detectors and masks having at least one slit located to coincide with at least one of said primary or secondary maxima fringes.

References Cited

UNITED STATES PATENTS 3,232,165  2/1966  Dupuy et al. _____ 356—111

JAMES W. LAWRENCE, Primary Examiner

V. LAFRANCHI, Assistant Examiner

U.S. Cl. X.R.

250—220, 218; 356—111